(12) United States Patent
Papani

(10) Patent No.: US 11,755,853 B1
(45) Date of Patent: Sep. 12, 2023

(54) TRACKING RECEPTACLES IN PHYSICAL ENVIRONMENTS

(71) Applicant: Adobe Inc., San Jose, CA (US)

(72) Inventor: Ravi Kiran Papani, Brentwood, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/903,425

(22) Filed: Sep. 6, 2022

(51) Int. Cl.
*G06K 7/10* (2006.01)
(52) U.S. Cl.
CPC .................. *G06K 7/10475* (2013.01)
(58) Field of Classification Search
CPC .................................... G06K 7/10475
See application file for complete search history.

(56) References Cited

U.S. PATENT DOCUMENTS

| | | | | |
|---|---|---|---|---|
| 7,516,890 | B1* | 4/2009 | Spremo | G06Q 10/087 705/28 |
| 9,928,698 | B2* | 3/2018 | Farrow | G06Q 10/00 |
| 2012/0293305 | A1* | 11/2012 | Shaw | H04M 1/72403 340/8.1 |
| 2015/0006319 | A1* | 1/2015 | Thomas | G06Q 30/0633 705/26.8 |
| 2016/0104175 | A1* | 4/2016 | Fanourgiakis | G06Q 10/0637 705/7.29 |
| 2019/0088096 | A1* | 3/2019 | King | G08B 13/19665 |
| 2019/0325385 | A1* | 10/2019 | Tingler | G06K 19/0723 |
| 2019/0370729 | A1* | 12/2019 | Meier | G06F 9/451 |

OTHER PUBLICATIONS

"Digital Signage with RFID Can Do More", RFID World [online] [retrieved Jul. 5, 2022]. Retrieved from the Internet <https://rfidworld.ca/digital-signage-with-rfid-can-do-more/2771>., 2 Pages.
"NoviSign and RFKeeper Showcase at the 2018 Marker Retail Conference in Israel", NoviSign Latest News [online] [retrieved Jul. 5, 2022]. Retrieved from the Internet <https://www.novisign.com/blog/news/rfkeeper-showcase-marker-retail-conference/>., Nov. 5, 2018, 5 Pages.

(Continued)

*Primary Examiner* — Tuyen K Vo
(74) *Attorney, Agent, or Firm* — FIG. 1 Patents

(57) ABSTRACT

In implementations of systems for tracking receptacles in physical environments, a computing device implements a tracking system to receive radio wave data describing first radio waves received by a first radio frequency antenna from a radio frequency tag embedded in a physical receptacle within a first region of a physical environment. The first radio waves indicate a unique identifier of the radio frequency tag. The tracking system computes an amount of time that the physical receptacle is within the first region based on the unique identifier of the radio frequency tag. An item is identified that does not include a radio frequency tag based on the amount of time and a unique identifier of the first radio frequency antenna. The tracking system generates an indication of information related to the item for display in a user interface of a display device disposed in a second region of the physical environment.

20 Claims, 6 Drawing Sheets

(56) References Cited

OTHER PUBLICATIONS

"RFID Digital Signage Displays", McCann Systems [retrieved Jul. 5, 2022]. Retrieved from the Internet <https://mccannsystems.com/news/rfid-digital-signage-displays/>., 4 Pages.

Cohan, Peter, "How Nordstrom Uses WiFi to Spy on Shoppers", Forbes [online] [retrieved Jul. 5, 2022]. Retrieved from the Internet <https://www.forbes.com/sites/petercohan/2013/05/09/how-nordstrom-and-home-depot-use-wifi-to-spy-on-shoppers/?sh=57d8b504-4362>., May 9, 2013, 5 Pages.

Kaplan, Marcia, "Beacons to Help Physical Stores Combat Ecommerce", Practical Ecommerce [online] [retrieved Jul. 5, 2022]. Retrieved from the Internet <https://www.practicalecommerce.com/Beacons-to-Help-Physical-Stores-Combat-Ecommerce>., Jan. 15, 2015, 4 Pages.

Little, David, "Digital signage: RFID data can open new horizons for retailers", Fibre2Fashion Pvt. Ltd. [online] [retrieved Jul. 5, 2022]. Retrieved from the Internet <https://www.fibre2fashion.com/industry-article/2561/digital-signage-rfid-data-can-open-new-horizons-for-retailers>., Oct. 2007, 6 Pages.

\* cited by examiner

500

502
Receive radio wave data describing first radio waves received by a first radio frequency antenna from a radio frequency tag embedded in a physical receptacle within a first region of a physical environment based on radio waves transmitted by the first radio frequency antenna within the first region, the first radio waves from the radio frequency tag indicating a unique identifier of the radio frequency tag

504
Compute an amount of time that the physical receptacle is within the first region based on the unique identifier of the radio frequency tag

506
Identify an item that does not include a radio frequency tag based on the amount of time and a unique identifier of the first radio frequency antenna

508
Generate an indication of information related to the item for display in a user interface of a display device disposed in a second region of the physical environment based on second radio waves received by a second radio frequency antenna from the radio frequency tag

*Fig. 5*

TRACKING RECEPTACLES IN PHYSICAL ENVIRONMENTS

BACKGROUND

Tracking systems for physical environments are implemented to track items that are available within the physical environments, users within the physical environments, or both the items and the users. For example, a physical environment that is a hospital implements a tracking system that tracks items (e.g., medical equipment) within the hospital using radio frequency tags attached to the items and tracks users (e.g., patients or physicians) within the hospital using facial recognition, mobile devices of the users, and so forth. In this example, tracking the items requires a radio frequency tag attached to each item which is undesirable for scenarios involving many items or involving items which are not intended to receive radio frequency tags (e.g., sterile, single-use medical devices). Further, tracking the users using facial recognition raises privacy and other issues while tracking the users using mobile devices requires installation of tracking applications on the mobile devices by the users which is burdensome.

SUMMARY

Techniques and systems for tracking receptacles in physical environments are described. In one example, a computing device implements a tracking system to receive radio wave data describing first radio waves received by a first radio frequency antenna from a radio frequency tag embedded in a physical receptacle within a first region of a physical environment based on radio waved transmitted by the first radio frequency antenna within the first region. The first radio waves from the radio frequency tag indicate a unique identifier of the radio frequency tag.

For example, an amount of time is computed that the physical receptacle is within the first region based on the unique identifier of the radio frequency tag. The tracking system identifies an item that does not include a radio frequency tag based on the amount of time and a unique identifier of the first radio frequency antenna. For instance, the tracking system generates an indication of information related to the item for display in a user interface of a display device disposed in a second region of the physical environment based on second radio waves received by a second radio frequency antenna from the radio frequency tag.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 is a flow diagram depicting a procedure in an example implementation in which an item is identified based on an amount of time that a physical receptacle is within a region of a physical environment, and an indication of information related to the item is generated for display in the physical environment.

DETAILED DESCRIPTION

Overview

Figure 1:
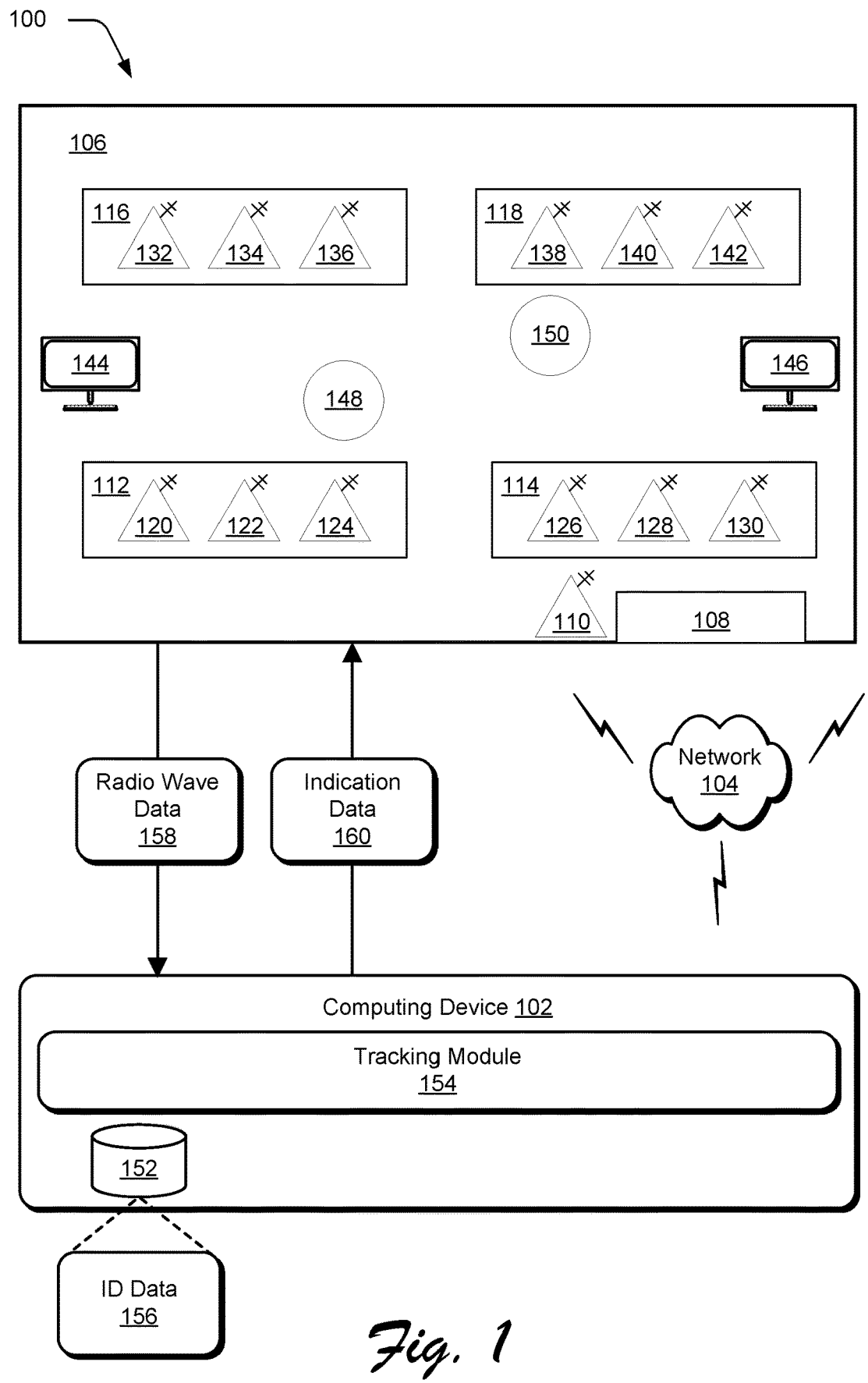
FIG. 1 is an illustration of an environment in an example implementation that is operable to employ digital systems and techniques for tracking receptacles in physical environments as described herein.

Conventional tracking systems for physical environments are implemented to track items that are available within the physical environments, users within the physical environments, or both the items and the users. Tracking items within a physical environment generally requires attaching a radio frequency tag to each of the items which is not practical for scenarios which involve large numbers of the items within the physical environment. Tracking users within the physical environment involves either capturing data of the users (e.g., using facial recognition) which raises privacy concerns or installation of applications on mobile devices of the users which is a burden for these users.

In order to overcome the limitations of conventional systems, techniques and systems are described for tracking receptacles in physical environments. In an example, a computing device implements a tracking system to receive radio wave data describing first radio waves received by a first radio frequency antenna from a radio frequency tag embedded in (or attached to) a physical receptacle within the first region of a physical environment. For instance, radio frequency tag is passive or active and the physical receptacle is a cart, a basket, a bag, etc.

The radio frequency tag embedded in the physical receptacle receives radio waves transmitted by the first radio frequency antenna within the first region of the physical environment. In response to receiving the radio waves from the first radio frequency antenna, the radio frequency tag embedded in the physical receptacle communicates the first radio waves to the first radio frequency antenna. For example, the first radio waves from the radio frequency tag indicate a unique identifier of the radio frequency tag, and the first radio frequency antenna receives the first radio waves and generates corresponding timestamps indicating when the first radio waves are received.

The tracking system receives the radio wave data as describing the unique identifier of the radio frequency tag, the timestamps, and a unique identifier of the first radio frequency antenna. In one example, the tracking system computes an amount of time that the physical receptacle is within the first region based on the timestamps and the unique identifier of the radio frequency tag embedded in the physical receptacle. In this example, the tracking system identifies an item that does not include a radio frequency tag based on the amount of time and the unique identifier of the first radio frequency antenna.

For instance, the item is a component of a product, a medical device, a complete product, and so forth. The tracking system infers a relationship between the physical receptacle and/or a user of the physical receptacle and the item based on the amount of time, e.g., the amount of time is greater than a threshold amount of time, the amount of time falls within a threshold time range, etc. In an example, the tracking system infers that the item is removed from the first region of the physical environment and included in the physical receptacle based on the amount of time. In another example, the tracking system infers that the user of the physical receptacle is interested in the item (e.g., has learned about the item) based on the amount of time.

After the amount of time, the physical receptacle moves within the physical environment and approaches a display device that is disposed in a second region of the physical environment. In one example, the display device is included as part of a digital signage system that is configured to display information within the physical environment. For example, the radio frequency tag embedded in the physical receptacle receives radio waves transmitted by a second radio frequency antenna within the second region of the physical environment. In this example, the second radio frequency antenna is included in or adjacent to the display device in the second region. In response to receiving the radio waves from the second radio frequency antenna, the radio frequency tag communicates second radio waves to the second radio frequency antenna that indicate the unique identifier of the radio frequency tag embedded in the physical receptacle.

The display device transmits the radio wave data to the tracking system via a network as describing the unique identifier of the radio frequency tag embedded in the physical receptacle and a unique identifier of the second radio frequency antenna. The tracking system receives and processes the radio wave data to generate indication data as describing a unique identifier of the item that the tracking system inferred is included in the physical receptacle. For instance, the tracking system transmits the indication data to the display device via the network.

The display device receives and processes the indication data to generate an indication of information related to the item for display in a user interface of the display device within the physical environment. For example, the information related to the item identifies an additional item that is complimentary or superior to the item. In one example, the information related to the item indicates a region within the physical environment where the additional item is available.

By tracking the physical receptacle using the unique identifier of the radio frequency tag embedded in the physical receptacle, the described systems are capable of identifying the item even though the item does not include a radio frequency tag. This is an improvement relative to conventional tracking systems for physical environments which require a radio frequency tag attached to an item in order to identify the item. Additionally, the described systems for tracking receptacles in physical environments do not capture user data (e.g., data of the user of the physical receptacle) or require installation of applications on mobile devices of users which is a further improvement relative to the conventional tracking systems for physical environments.

Term Examples

As used herein, the term "item" refers to a physical item which is removeable from a region of a physical environment and includable in a receptacle. Examples of physical items include components of products, medical devices, complete products, textiles, etc. For example, an item does not include a radio frequency tag.

As used herein, the term "receptacle" refers to a physical receptacle which is capable of containing an item or multiple items and which includes a radio frequency tag having a unique identifier. Examples of receptacles include carts, baskets, bags, bins, boxes, and so forth.

As used herein, the term "region" refers to a section of a physical environment that includes or is associated with at least one radio frequency antenna having a unique identifier.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

As shown, the environment 100 includes a physical environment 106 which has an entrance/exit 108 that facilitates an ingress into the physical environment 106 and an egress out from the physical environment 106. A radio frequency antenna 110 is disposed within or adjacent to the entrance/exit 108. In an example, the radio frequency antenna 110 has (or is associated with) a unique identifier.

Within the physical environment 106, regions 112-118 contain and display items that are available in the physical environment 106. For example, a first region 112 has a first set of items and radio frequency antennae 120-124; a second region 114 has a second set of items and radio frequency antennae 126-130; a third region 116 has a third set of items and radio frequency antennae 132-136; and a fourth region 118 has a fourth set of items and radio frequency antennae 138-142. Each of the antennae 120-142 has a unique identifier that is usable to differentiate between radio waves received by a first one of the radio frequency antennae 120-142 and radio waves received by a second one of the radio frequency antennae 120-142. In one example, each of these unique identifiers is also associated with a particular one of the regions 112-118 and/or a particular subregion of one of the regions 112-118.

The physical environment 106 is illustrated to include a first display device 144 and a second display device 146. In some examples, the first display device and the second display device 146 are part of a digital signage system configured to display information within the physical environment 106. For instance, the display devices 144, 146 each include a radio frequency antenna that also has a unique identifier. A first physical receptacle 148 is capable of containing items available at any of the regions 112-118 and the first physical receptacle 148 includes a radio frequency tag with a unique identifier. A second physical receptacle 150 is also capable of containing items available at any of the regions 112-118 and includes a radio frequency tag with a unique identifier. The radio frequency antennae 120-142 transmit radio waves (e.g., continuous waves) within the physical environment 106 which are receivable by the radio frequency tags of the first and second physical receptacles 148, 150 if the physical receptacles are within a threshold distance of one of the radio frequency antennae 120-142 in the physical environment 106.

Consider an example in which the radio frequency tag embedded in the first physical receptacle 148 receives radio waves transmitted by radio frequency antenna 124 within the first region 112. In this example, the radio frequency tag (which is passive or active) communicates radio waves to the radio frequency antenna 124 in response to receiving the radio waves transmitted by the radio frequency antenna 124 that indicate the unique identifier of the radio frequency tag embedded in the first physical receptacle 148. The radio frequency antenna 124 receives the radio waves from the radio frequency tag which indicate the unique identifier of the radio frequency tag, and the radio frequency antenna 124 generates a corresponding timestamp, computes a distance between the radio frequency tag and the radio frequency antenna 124, and so forth.

The computing device 102 includes a storage device 152 and a tracking module 154. The storage device 152 is illustrated to include ID data 156 that describes the unique identifiers of the radio frequency antennae 120-142, the unique identifier of the radio frequency antenna of the first display device 144, the unique identifier of the radio frequency antenna of the second display device 146, the unique identifier of the radio frequency tag embedded in the first physical receptacle 148, and the unique identifier of the radio frequency tag embedded in the second physical receptacle 150. For example, the ID data 156 also describes items available in each of the regions 112-118.

The tracking module 154 is illustrated as having, receiving, and/or transmitting radio wave data 158. In the example in which the radio frequency antenna 124 receives the radio waves from the radio frequency tag embedded in the first physical receptacle 148, the tracking module 154 receives the radio wave data 158 as describing the unique identifier of the radio frequency antenna 124, the unique identifier of the radio frequency tag, the timestamp, the distance between the radio frequency tag and the radio frequency antenna 124, etc. The tracking module 154 processes the radio wave data 158 to determine an amount of time that the first physical receptacle 148 is within the first region 112 of the physical environment 106. In some examples, the tracking module 154 processes the radio wave data 158 to determine an amount of time that the first physical receptacle 148 is within a subregion of the first region 112 that includes the radio frequency antenna 124.

Based on the amount of time that the first physical receptacle 148 is within the first region 112 (or the subregion of the first region 112), the tracking module 154 is capable of inferring a relationship between the first physical receptacle 148 and/or a user of the first physical receptacle 148 and the first region 112 (or the subregion of the first region 112). In an example, the tracking module 154 is capable of inferring whether or not an item that is available within the first region 112 has been removed from the first region 112 and added to the first physical receptacle 148. For instance, the tracking module 154 processes the ID data 156 to determine the first set of items available in the first region 112. In one example, the tracking module 154 processes the ID data 156 to determine a subset of the first set of items which is available in the subregion of the first region 112 that includes the radio frequency antenna 124.

The tracking module 154 identifies an item based the ID data 156, and the tracking module 154 infers that the identified item has been removed from the first region 112 and added to (included in) the first physical receptacle 148 based on the amount of time that the first physical receptacle 148 is within the first region 112. For example, the item does not include a radio frequency tag. Continuing this example, the first physical receptacle 148 moves within the physical environment 106 and approaches the first display device 144.

The radio frequency antenna of the first display device 144 transmits radio waves within the physical environment 106 which are received by the radio frequency tag embedded in the first physical receptacle 148. In response to receiving the radio waves transmitted by the radio frequency antenna of the first display device 144, the radio frequency tag communicates radio waves to the radio frequency antenna of the first display device 144 that indicate the unique identifier of the radio frequency tag. The radio frequency antenna of the first display device 144 receives the radio waves communicated from the radio frequency tag, and the first display device 144 generates the radio wave data 158 as describing the unique identifier of the radio frequency tag embedded in the first physical receptacle 148.

In this example, the tracking module 154 receives and processes the radio wave data 158 describing the unique identifier of the radio frequency tag embedded in the first physical receptacle 148, and the tracking module 154 generates indication data 160 describing the identified item (e.g., that does not include a radio frequency tag or a machine-readable label) which the tracking module 154 has inferred is included in the first physical receptacle 148 based on the amount of time that the first physical receptacle 148 is within the first region 112. The first display device 144 receives and processes the indication data 160 and displays an indication of information related to the item in a user interface of the first display device 144. In some examples, the indication data 160 describes the information related to the item. In other examples the indication data 160 describes the item and the first display device 144 determines the information related to the item to display within the physical environment 106.

Consider an example in which the first display device 144 displays the indication of information related to the item within the physical environment 106, and as a result of displaying the indication, a trajectory of the first physical receptacle 148 within the physical environment 106 changes or is modified. For example, before the first display device 144 displays the indication of information related to the item within the physical environment 106, the trajectory of the first physical receptacle 148 is approaching the entrance/exit 108. In this example, after the first display device 144 displays the indication of information related to the item within the physical environment 106, the trajectory of the first physical receptacle 148 changes and approaches the third region 116. For instance, the information related to the item indicates that an alternative item is available within the third region 116, a complimentary item is available within the third region 116, a superior item is available within the third region 116, etc.

Continuing the example, the radio frequency tag embedded in the first physical receptacle 148 receives radio waves transmitted by radio frequency antenna 136 within the third region 116. The radio frequency tag communicates radio waves to the radio frequency antenna 136 (in response to receiving the radio waves transmitted by the radio frequency antenna 136) that indicate the unique identifier of the radio frequency tag embedded in the first physical receptacle 148. The radio frequency antenna 136 receives the radio waves from the radio frequency tag which indicate the unique identifier of the radio frequency tag, and the tracking module 154 receives the radio wave data 158 as describing the unique identifier of the radio frequency tag and a unique identifier of the radio frequency antenna 136. For example, the tracking module 154 receives and processes the radio wave data 158 (e.g., and accesses/processes the ID data 156) to determine that the first physical receptacle 148 is within the third region 116 after the first display device 144 displays the indication of information related to the item that indicates an additional item (e.g., which is alternative, complimentary, superior, etc.) is available within the third region 116.

Consider an alternative version of the previous example in which the first display device 144 displays the indication of information related to the item within the physical environment 106, and the trajectory of the first physical receptacle 148 within the physical environment 106 does not change or is unmodified. For instance, before the first display device 144 displays the indication of information related to the item within the physical environment 106, the trajectory of the first physical receptacle 148 is approaching the entrance/exit 108. After the first display device 144 displays the indication of information related to the item within the physical environment 106, the trajectory of the first physical receptacle 148 is still approaching the entrance/exit 108.

For example, the radio frequency tag embedded in the first physical receptacle 148 receives radio waves transmitted by the radio frequency antenna 110 that is adjacent to the entrance/exit 108. The radio frequency tag communicates radio waves to the radio frequency antenna 110 which indicate the unique identifier of the radio frequency tag embedded in the first physical receptacle 148. The radio frequency antenna 110 receives the radio waves from the radio frequency tag which indicate the unique identifier of the radio frequency tag, and the tracking module 154 receives the radio wave data 158 as describing the unique identifier of the radio frequency tag and a unique identifier of the radio frequency antenna 110 that is adjacent to the entrance/exit 108. The tracking module 154 receives and processes the radio wave data 158 (e.g., and accesses/processes the ID data 156) to determine that the first physical receptacle 148 is within the entrance/exit 108.

In another example, the tracking module 154 receives the radio wave data 158 as describing a unique identifier of radio frequency antenna 138, the unique identifier of the radio frequency tag embedded in the second physical receptacle 150, a timestamp (e.g., generated by the radio frequency antenna 138 upon receipt of radio waves from the radio frequency tag embedded in the second physical receptacle 150), a computed distance between the radio frequency tag and the radio frequency antenna 138, and so forth. The tracking module 154 processes the radio wave data 158 to determine an amount of time that the second physical receptacle 150 is within the fourth region 118 of the physical environment 106. In this example, it is unnecessary for the tracking module 154 to access and process the ID data 156 to determine the fourth set of items available within the fourth region 118 because the tracking module 154 infers that no items are removed from the fourth region 118 and added to the second physical receptacle 150 based on the amount of time that the second physical receptacle 150 is within the fourth region 118 of the physical environment 106.

In a first example, the physical environment 106 is a portion of a hospital or surgery center and the items available within the physical environment are medical devices for performing various surgical procedures. The first physical receptacle 148 is a surgical tray and a surgical technician removes a medical device from the first region 112 and includes the medical device in the first physical receptacle 148. In this first example, the tracking module 154 receives the radio wave data 158 as describing the unique identifier of the radio frequency antenna 124, the unique identifier of the radio frequency tag embedded in the first physical receptacle 148, a timestamp (e.g., generated when the radio frequency antenna 124 receives radio waves from the radio frequency tag embedded in the first physical receptacle 148), a computed distance between the radio frequency tag and the radio frequency antenna 124, and so forth.

Continuing the first example, the tracking module 154 processes the radio wave data 158 and/or the ID data 156 to infer that the medical device has been removed from the first region 112 and is included in the first physical receptacle 148. The tracking module 154 generates the indication data 160 as describing the medical device, and the first display device 144 receives and processes the indication data 160 to generate and display an indication of information related to the medical device. For example, the first display device 144 displays the indication of information related to the medical device as indicating that the medical device requires an adaptor which is available in the third region 116. The tracking module 154 receives and processes the radio wave data 158 to infer that the adaptor for the medical device has been removed from the third region 116 and included in the first physical receptacle 148.

In a second example, the physical environment 106 is a component inventory of a manufacturing center and the items available within the physical environment are components which are assembled into products in a separate physical environment. The first physical receptacle 148 is manufacturing kit for manufacturing a particular type of product and a manufacturing technician removes a component from the first region 112 and includes the component in the first physical receptacle 148. In this second example, the tracking module 154 receives the radio wave data 158 as describing the unique identifier of the radio frequency antenna 124, the unique identifier of the radio frequency tag embedded in the first physical receptacle 148, a timestamp (e.g., generated when the radio frequency antenna 124 receives radio waves from the radio frequency tag embedded in the first physical receptacle 148), a computed distance between the radio frequency tag and the radio frequency antenna 124, etc.

Continuing the second example, the tracking module 154 processes the radio wave data 158 and/or the ID data 156 to infer that the component has been removed from the first region 112 and is included in the first physical receptacle 148. For instance, the tracking module 154 generates the indication data 160 as describing the component. The first display device 144 receives and processes the indication data 160 to generate and display an indication of information related to the component. In one example, the first display device 144 displays the indication of information related to the component as indicating that the component requires a fixture for manufacturing the particular type of product which is available in the second region 114. The tracking module 154 receives and processes the radio wave data 158 to infer that the fixture for the component has been removed from the second region 114 and included in the first physical receptacle 148.

In a third example, the physical environment 106 is retail center and the items available within the physical environment are products. The first physical receptacle 148 is a cart, a basket, or a bag. For example, a client of the retail center removes a product from the first region 112 and includes the product in the first physical receptacle 148. In this third example, the tracking module 154 receives the radio wave data 158 as describing the unique identifier of the radio frequency antenna 124, the unique identifier of the radio frequency tag embedded in the first physical receptacle 148, a timestamp (e.g., generated when the radio frequency antenna 124 receives radio waves from the radio frequency tag embedded in the first physical receptacle 148), a computed distance between the radio frequency tag and the radio frequency antenna 124, and so forth.

Continuing the third example, the tracking module 154 processes the radio wave data 158 and/or the ID data 156 to infer that the product has been removed from the first region 112 and is included in the first physical receptacle 148. For instance, the tracking module 154 generates the indication data 160 as describing the product. The first display device 144 receives and processes the indication data 160 to generate and display an indication of information related to the product. In an example, the first display device 144 displays the indication of information related to the product as indicating that an accessory for the product is currently discounted and the accessory is available in the fourth region 118. The tracking module 154 receives and processes the radio wave data 158 to infer that the accessory for the product has been removed from the fourth region 118 and included in the first physical receptacle 148.

Figure 2:
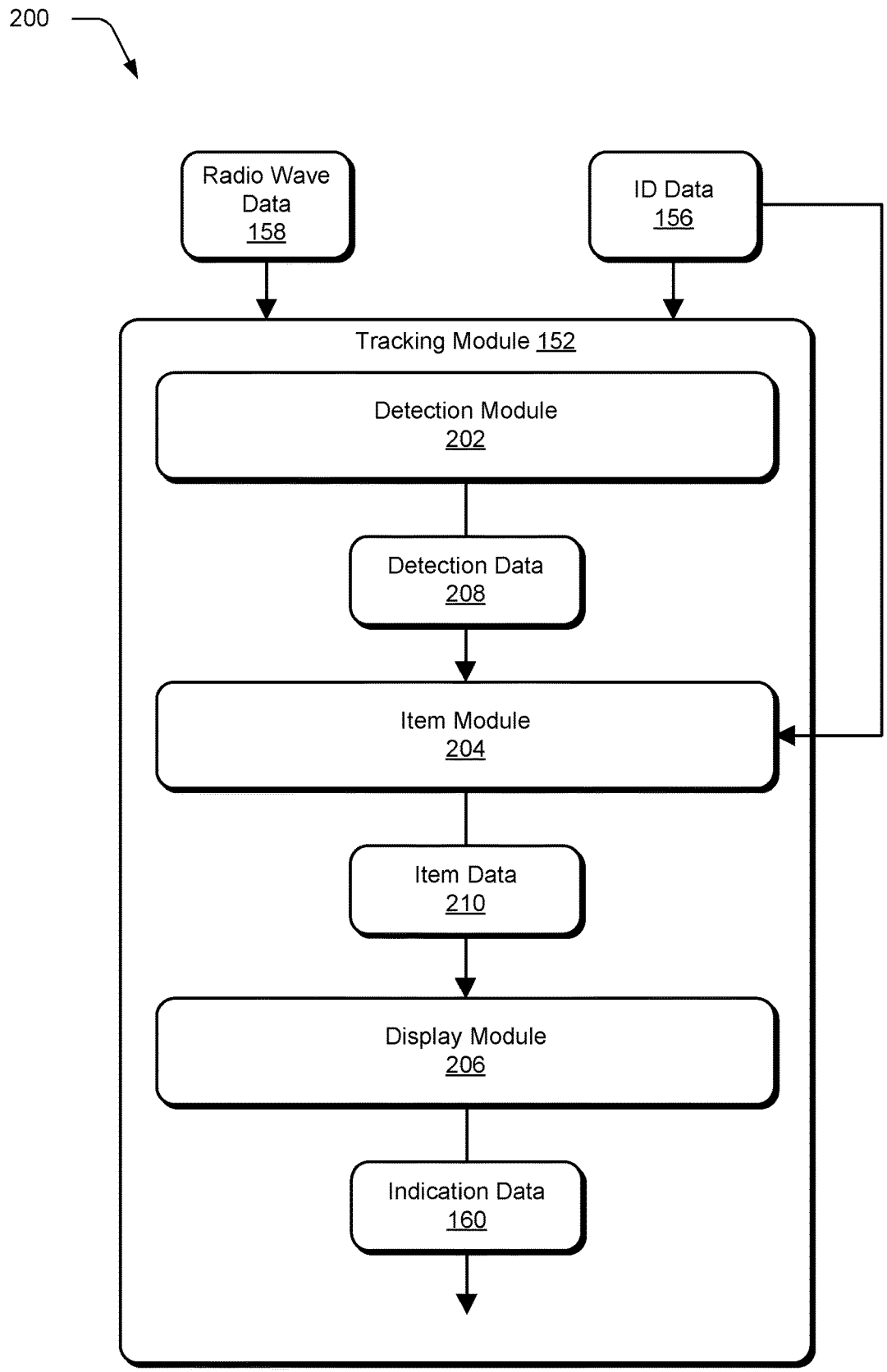
FIG. 2 depicts a system in an example implementation showing operation of a tracking module for tracking receptacles in physical environments.

FIG. 2 depicts a system 200 in an example implementation showing operation of a tracking module 154. The tracking module 154 is illustrated to include a detection module 202, an item module 204, and a display module 206. For example, the detection module 202 receives and processes the ID data 156 and the radio wave data 158 to generate detection data 208.

Figure 3:
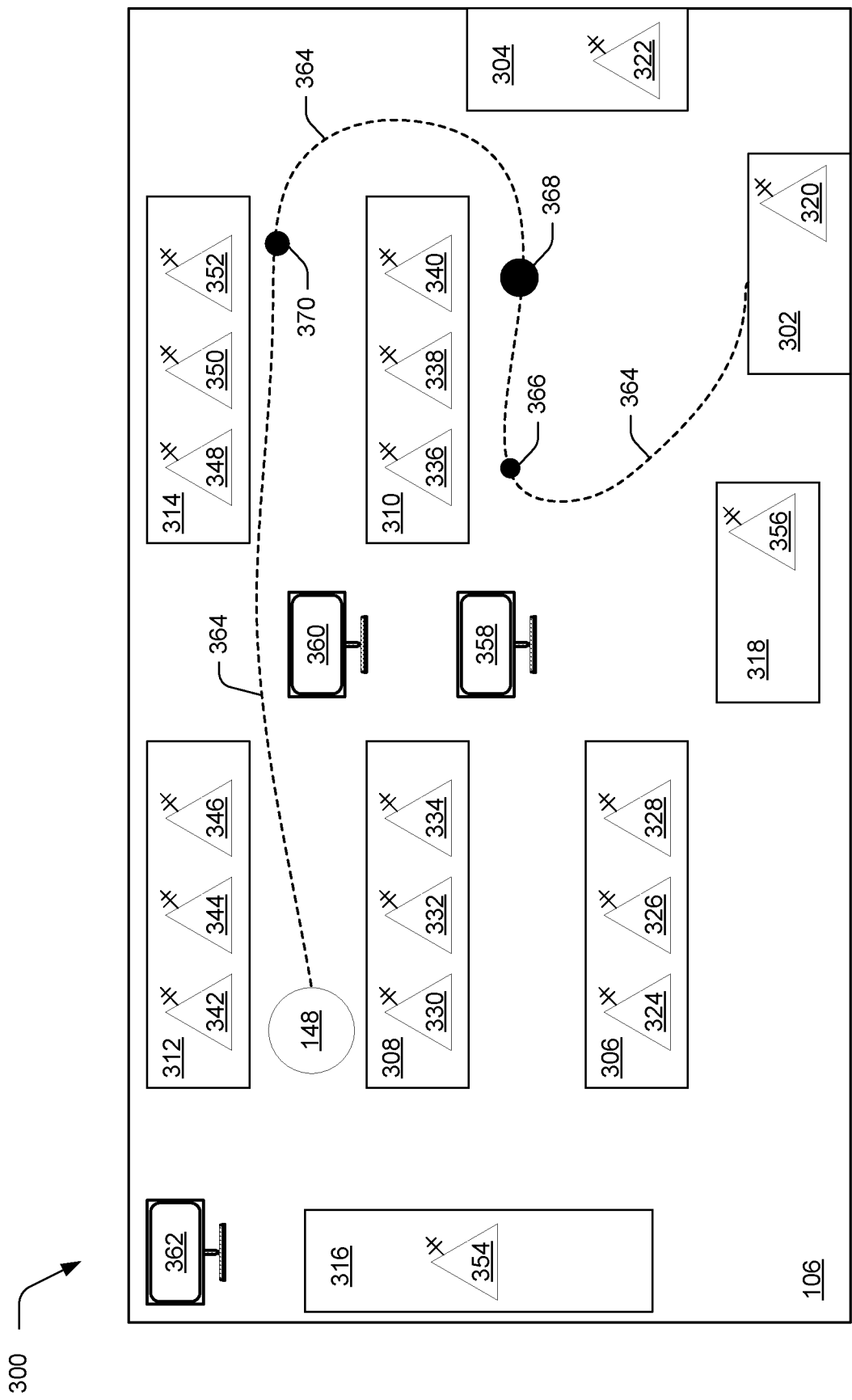
FIG. 3 illustrates a representation of tracking a receptacle in a physical environment before displaying an indication of information related to an item in the physical environment.

FIG. 3 illustrates a representation 300 of tracking a receptacle in a physical environment before displaying an indication of information related to an item in the physical environment. The representation 300 depicts a physical environment 106 which includes an entrance 302 for facilitating an ingress into the physical environment 106 as well as an exit 304 for facilitating an egress out from the physical environment 106. For instance, the physical environment 106 includes regions 306-316 which contain and display items that are available within the physical environment 106.

A first region 306 has a first set of items, a second region 308 has a second set of items, a third region 310 has a third set of items, a fourth region 312 has a fourth set of items, a fifth region 314 has a fifth set of items, a sixth region 316 has a six set of items, and so forth. For example, the physical environment 106 includes an additional region 318 which does not contain or display items that are available within the physical environment 106. The entrance 302 is illustrated to include a radio frequency antenna 320; the exit 304 is illustrated to include a radio frequency antenna 322; the first region 306 is illustrated to include radio frequency antennae 324-328; the second region 308 is illustrated to include radio frequency antennae 330-334; the third region 310 is illustrated to include radio frequency antennae 336-340; the fourth region 312 is illustrated to include radio frequency antennae 342-346; the fifth region 314 is illustrated to include radio frequency antennae 348-352; the sixth region 316 is illustrated to include a radio frequency antenna 354; and the additional region 318 is illustrated to include a radio frequency antenna 356.

The physical environment 106 is illustrated to include display devices 358-362 which are representative of a digital signage system configured to display information within the physical environment 106. In one example, the display devices 358-362 are included in an interactive or dynamic digital signage system configured to display information within the physical environment 106. In some examples, the digital signage system is configured to display information within the physical environment 106 that is for a particular user within the physical environment 106 without capturing any data of the particular user or leveraging a computing device (e.g., a smartphone) of the particular user. In these examples, the digital signage system displays the information for the particular user in a manner which is anonymous with respect to the particular user.

For example, each of the display devices 358-362 has or includes a radio frequency antenna with a unique identifier which is usable to distinguish between radio waves transmitted by a radio frequency antenna of display device 358 and radio waves transmitted by a radio frequency antenna of display devices 360, 362. In some examples, the display devices 358-362 have dedicated computing devices with limited memory and/or processing resources. In these examples, the computing devices of the display devices 358-362 are capable of transmitting data to the computing device 102, the tracking module 154 and/or another device or system via the network 104. Similarly, the computing devices of the display devices 358-362 are capable of receiving data from the computing device 102, the tracking module 154 and/or another device or system via the network 104. In other examples, the display devices 358-362 have dedicated computing devices with substantial memory and/or processing resources. In some of these other examples, each or the display devices 358-362 includes a computing device 102 and a tracking module 154.

For example, the computing devices of the display devices 358-362 are capable of transmitting data describing a unique identifier of a radio frequency tag embedded in a receptacle to the computing device 102 and/or the tracking module 154 via the network 104. In this example, the computing devices of the display devices 358-362 are capable of receiving data describing an item identified as being included in the receptacle having the embedded radio frequency tag with the unique identifier from the computing device 102 and/or the tracking module 154 via the network 104. Continuing the example, the computing devices of the display devices 358-362 are further capable of generating an indication of information related to the item identified as being included in the receptacle, and the display devices 358-362 are capable of rendering the indication of information for display within the physical environment 106.

In one example, the network 104 is not available for transmitting and/or receiving data within the physical environment 106 such as between a computing device of the display device 358 and a computing device of the display devices 360, 362. In this example, availability of the network 104 within the physical environment 106 is not necessary for tracking receptacles in physical environments. In another example, the network 104 is available for transmitting and/or receiving data within the physical environment 106 such as between the computing device of the display device 358 and computing devices of the display devices 360, 362.

As shown in FIG. 3, a physical receptacle 148 is disposed within the physical environment 106 and the representation 300 includes a trajectory 364 of the physical receptacle 148 within the physical environment 106. For instance, the trajectory 364 begins at the entrance 302 and a radio frequency tag embedded in the physical receptacle 148 receives radio waves transmitted by the radio frequency antenna 320 within or adjacent to the entrance 302. The radio frequency tag embedded in the physical receptacle 148 is active (e.g., includes a dedicated power source) or passive (e.g., does not include a dedicated power source) and has a unique identifier that is associated with the physical receptacle 148.

For example, the radio frequency tag embedded in the physical receptacle 148 communicates radio waves to the radio frequency antenna 320 in response to receiving the radio waves transmitted by the radio frequency antenna 320. In an example in which the radio frequency tag is active, the radio frequency tag communicates the radio waves to the radio frequency antenna 320 using the dedicated power source. In an example in which the radio frequency tag is passive, the radio frequency tag communicates the radio waves to the radio frequency antenna 320 using energy from the radio waves received from the radio frequency antenna 320 and backscattering, modulation, and so forth. In either example, the radio waves communicated by the radio frequency tag include an indication of the unique identifier of the radio frequency tag.

In one example, the detection module 202 receives the radio wave data 158 as describing the unique identifier of the radio frequency tag embedded in the physical receptacle 148 and a unique identifier of the radio frequency antenna 320. For instance, the ID data 156 describes the unique identifier of the radio frequency antenna 320 as being associated with the entrance 302. The detection module 202 processes the radio wave data 158 and/or the ID data 156 to determine that the physical receptacle 148 is detected within the entrance 302, and the detection module 202 generates the detection data 208 as describing a new tracking session for the physical receptacle 148 within the physical environment 106.

The physical receptacle 148 continues along the trajectory 364 within the physical environment 106 and approaches the third region 310 which contains and displays the third set of items. In an example, the radio frequency tag embedded in the physical receptacle 148 receives radio waves transmitted by radio frequency antenna 336 within the third region 310. In this example, the radio frequency tag communicates first radio waves (e.g., to be associated with a first timestamp) to the radio frequency antenna 336 in response to receiving the radio waves transmitted by the radio frequency antenna 336. The radio frequency antenna 336 receives the first radio waves from the radio frequency tag which indicate the unique identifier of the radio frequency tag, and the radio frequency antenna 336 generates a timestamp (e.g., the first timestamp), computes a distance between the radio frequency tag and the radio frequency antenna 336, and so forth.

The detection module 202 receives the radio wave data 158 as describing the unique identifier of the radio frequency antenna 336, the unique identifier of the radio frequency tag, the timestamp, the distance between the radio frequency tag and the radio frequency antenna 336, etc. The detection module 202 processes the radio wave data 158 to determine an amount of time that the physical receptacle 148 is within the third region 310 or a subset of the third region 310 which includes the radio frequency antenna 336. For example, the detection module 202 generates the detection data 208 as describing the amount of time that the physical receptacle 148 is within the third region 310 or the subset of the third region 310. In the representation 300, the amount of time that the physical receptacle 148 is within the third region 310 or the subset of the third region 310 is represented by an indicator 366 such that a size of the indicator 366 corresponds to the amount of time and a greater size represents a greater amount of time.

The physical receptacle 148 continues along the trajectory 364 within the third region 310 or adjacent to the third region 310 which has the third set of items. For example, the radio frequency tag embedded in the physical receptacle 148 receives radio waves transmitted by radio frequency antenna 340 within the third region 310 or an additional subset of the third region 310. In response to receiving the radio waves transmitted by the radio frequency antenna 340, the radio frequency tag embedded in the physical receptacle 148 communicates second radio waves (e.g., to be associated with a second timestamp) to the radio frequency antenna 340. Continuing this example, the radio frequency antenna 340 receives the second radio waves from the radio frequency tag which indicate the unique identifier of the radio frequency tag, and the radio frequency antenna 340 generates a timestamp (e.g., the second timestamp), computes a distance between the radio frequency tag and the radio frequency antenna 340, etc.

The detection module 202 receives the radio wave data 158 as describing the unique identifier of the radio frequency tag, the timestamp, the distance between the radio frequency tag and the radio frequency antenna 340, and so forth. For example, the detection module 202 processes the radio wave data 158 to determine an amount of time that the physical receptacle 148 is within the third region 310 or the additional subset of the third region 310 which includes the radio frequency antenna 340. In this example, the detection module 202 generates the detection data 208 as describing the amount of time that the physical receptacle 148 is within the third region 310 or the additional subset of the third region 310. In the representation 300, the amount of time that the physical receptacle 148 is within the third region 310 or the additional subset of the third region 310 is represented by an indicator 368.

As shown, the indicator 368 has a size that is larger than the size of the indicator 366 which indicates that the physical receptacle 148 is within the additional subset of the third region 310 for a greater amount of time than the amount of time that physical receptacle 148 is within the subset of the third region 310. As further shown, the physical receptacle 148 continues along the trajectory 364 within the physical environment 106 and approaches the fifth region 314 which contains and displays the fifth set of items. For example, the radio frequency tag embedded in the physical receptacle 148 receives radio waves transmitted from radio frequency antenna 352 within the fifth region 314 or a subset of the fifth region 314.

Responsive to receiving the radio waves from the radio frequency antenna 352, the radio frequency tag embedded in the physical receptacle 148 communicates third radio waves (e.g., to be associated with a third timestamp) to the radio frequency antenna 352. For instance, the radio frequency antenna 352 receives the third radio waves from the radio frequency tag which indicate the unique identifier of the radio frequency tag. Upon receiving the third radio waves, the radio frequency antenna 352 generates a timestamp (e.g., the third timestamp), computes a distance between the radio frequency tag and the radio frequency antenna 352, and so forth. The detection module 202 receives the radio wave data 158 as describing the unique identifier of the radio frequency tag, the timestamp, the distance between the radio frequency tag and the radio frequency antenna 352, etc.

In one example, the detection module 202 processes the radio wave data 158 to determine an amount of time that the physical receptacle 148 is within the fifth region 314 or the subset of the fifth region 314 which includes the radio frequency antenna 352. In this example, the detection module 202 generates the detection data 208 as describing the amount of time that the physical receptacle 148 is within the fifth region 314 or the subset of the fifth region 314. In the representation 300, the amount of time that the physical receptacle 148 is within the fifth region 314 or the subset of the fifth region 314 is represented by an indicator 370.

For example, a size of the indicator 370 is greater than the size of the indicator 366 and smaller than the size of the indicator 368. This indicates that the physical receptacle 148 is within the fifth region 314 or the subset of the fifth region 314 for a greater amount of time than the amount of time that physical receptacle 148 is within the subset of the third region 310 and for a smaller amount of time than the amount of time that the physical receptacle 148 is within the additional subset of the third region 310. With reference to FIG. 2, the item module 204 receives the detection data 208 as describing the amount of time associated with the indicator 366 and the unique identifier of the radio frequency antenna 336; the amount of time associated with the indicator 368 and the unique identifier of the radio frequency antenna 340; and the amount of time associated with the indicator 370 and the unique identifier of the radio frequency antenna 352.

For example, the item module 204 processes the detection data 208 and/or the ID data 156 to identify an item which is removed from the third region 310 or the fifth region 314 and is contained in the physical receptacle 148. In an example, the item does not include a radio frequency tag (or any other machine-readable identifier), and the item module 204 identifies the item based on the amount of time that the physical receptacle 148 is within the subset of the third region 310, the amount of time that the physical receptacle 148 is within the additional subset of the third region 310, and/or the amount of time that the physical receptacle 148 is within the fifth region 314. For instance, the item module 204 generates the item data 210 as describing the item associated with the unique identifier of the radio frequency tag that is embedded in the physical receptacle 148.

In the illustrated example, the physical receptacle 148 continues along the trajectory 364 within the physical environment 106 and approaches display device 362. In one example, the radio frequency tag embedded in the physical receptacle 148 receives radio waves transmitted by a radio frequency antenna of the display device 362 within the physical environment 106. In this example, in response to receiving the radio waves from the radio frequency antenna of the display device 362, the radio frequency tag embedded in the physical receptacle 148 communicates fourth radio waves (e.g., to be associated with a fourth timestamp) to the radio frequency antenna of the display device 362. The radio frequency antenna of the display device 362 receives the fourth radio waves from the radio frequency tag which indicate the unique identifier of the radio frequency tag, and the radio frequency antenna of the display device 362 generates a timestamp (e.g., the fourth timestamp), computes a distance between the radio frequency tag and the radio frequency antenna of the display device 362, and so forth. The display device 362 generates the radio wave data 158 as describing the unique identifier of the radio frequency tag embedded in the physical receptacle 148 and a unique identifier of the radio frequency antenna of the display device 362.

For example, the display device 362 transmits the radio wave data 158 to the detection module 202 via the network 104. The detection module 202 receives the radio wave data 158 as describing the unique identifier of the radio frequency tag embedded in the physical receptacle 148 and the unique identifier of the radio frequency antenna of the display device 362. In an example, the detection module 202 processes the radio wave data 158 and/or the ID data 156 to identify the unique identifier of the radio frequency antenna of the display device 362 as corresponding to a request for indication data 160 describing items that have been removed from any of the regions 306-316 and included in the physical receptacle 148. In this example, the detection module 202 generates the detection data 208 as describing the request for indication data 160, the unique identifier of the radio frequency tag embedded in the physical receptacle 148, and the unique identifier of the radio frequency antenna of the display device 362.

The item module 204 receives and processes the detection data 208 and/or the ID data 156 to generate the item data 210. For example, the item module 204 generates the item data 210 as describing the item associated with the unique identifier of the radio frequency tag embedded in the physical receptacle 148 and the unique identifier of the radio frequency antenna of the display device 362. In this example, the display module 206 receives and processes the item data 210 to generate the indication data 160 which the display module 206 communicates to the display device 362 via the network 104.

In one example, the display module 206 generates the indication data 160 as describing information related to the item. In another example, the display module 206 generates the indication data 160 as describing a unique identifier of the item. The display device 362 receives the indication data 160 via the network 104 and the display device 362 processes the indication data 160 to generate an indication of the information related to the item for display in a user interface of the display device 362 within the physical environment 106.

In some examples, the display device 362 displays the indication of the information related to the item in the user interface and the display device 362 also transmits the radio wave data 158 to the tracking module 154 as describing a confirmation that the information related to the item is displayed within the physical environment 106. In these examples, the tracking module 154 receives and processes the radio wave data 158 to identify scenarios which indicate an occurrence of an event based on the displayed indication of the information related to the item within the physical environment 106. For example, when the indication of the information related to the item is displayed in the physical environment 106, this causes the physical receptacle 148 to approach a particular one of the regions 306-316. In this example, receiving the radio wave data 158 as describing a unique identifier of a radio frequency antenna included in the particular one of the regions 306-316 and the unique identifier of the radio frequency tag embedded in the physical receptacle 148 is a scenario which indicates the occurrence of the event (e.g., the physical receptacle 148 approached the particular one of the regions 306-316 based on the displayed indication of the information related to the item).

Figure 4:
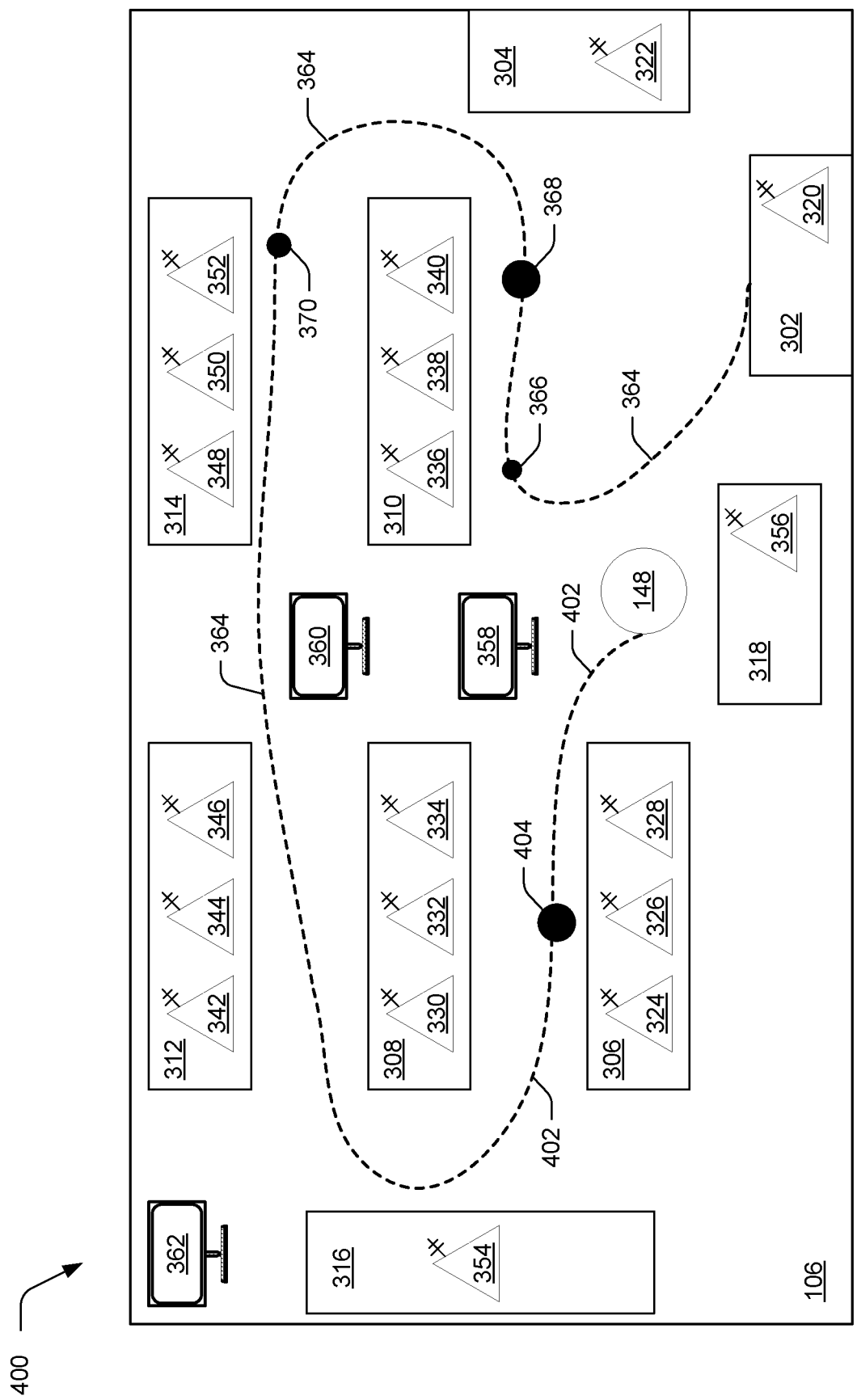
FIG. 4 illustrates a representation of tracking a receptacle in a physical environment after displaying an indication of information related to an item in the physical environment.

FIG. 4 illustrates a representation 400 of tracking a receptacle in a physical environment after displaying an indication of information related to an item in the physical environment. For example, after the display device 362 displays the indication of the information related to the item within the physical environment 106, the physical receptacle 148 moves within the physical environment 106 along a new trajectory 402. In some examples, the new trajectory 402 is based on the information related to the item displayed by the display device 362. In other examples, the new trajectory 402 is independent of or unrelated to the information related to the item displayed by the display device 362.

Consider an example in which the item is removed from the additional subset of the third region 310 (which includes the radio frequency antenna 340) and the item is included in the physical receptacle 148. In this example, the information related to the item displayed by the display device 362 indicates that an additional item is available within a subset of the first region 306 that includes radio frequency antenna 326. For example, the additional item is complimentary to the item, an alternative to the item, superior to the item, etc. In this example, the additional item does not include a radio frequency tag.

The tracking module 154 leverages a unique identifier of the radio frequency antenna 326 to determine whether the new trajectory 402 is based on the information related to the item displayed by the display device 362 in some examples. As shown, the physical receptacle 148 moves within the physical environment 106 along the new trajectory 402 and approaches the first region 306 that has the first set of items. For instance, the radio frequency tag embedded in the physical receptacle 148 receives radio waves transmitted by the radio frequency antenna 326 within the first region 306 or the subset of the first region 306. In response to receiving the radio waves from the radio frequency antenna 326, the radio frequency tag embedded in the physical receptacle 148 communicates fifth radio waves (e.g., to be associated with a fifth timestamp) to the radio frequency antenna 326.

The radio frequency antenna 326 receives the fifth radio waves from the radio frequency tag embedded in the physical receptacle 148 which indicate the unique identifier of the radio frequency tag. Upon receiving the fifth radio waves, the radio frequency antenna 326 generates a timestamp (e.g., the fifth timestamp), computes a distance between the radio frequency tag and the radio frequency antenna 326, and so forth. The detection module 202 receives the radio wave data 158 as describing the unique identifier of the radio frequency tag embedded in the physical receptacle 148 and a unique identifier of the radio frequency antenna 326. In one example, the detection module 202 processes the radio wave data 158 to determine an amount of time that the physical receptacle 148 is within the first region 306 or the subset of the first region 306 that includes the radio frequency antenna 326. In this example, the detection module 202 generates the detection data 208 as describing the amount of time that the physical receptacle 148 is within the first region 306 or the subset of the first region 306. In the representation 300, the amount of time that the physical receptacle 148 is within the first region 306 or the subset of the first region 306 is represented by an indicator 404.

Continuing the example, the item module 204 receives and processes the detection data 208 and/or the ID data 156 and determines whether or not the additional item is removed from the first region 306 or the subset of the first region 306 and included in the physical receptacle 148. In some examples, the item module 204 determines whether or not the additional item is included in the physical receptacle 148 based on the amount of time that the physical receptacle 148 is within the first region 306 or the subset of the first region 306. In this example, the tracking module 154 determines that the new trajectory 402 is based on the information related to the item displayed by the display device 362.

Consider another example in which the information related to the item displayed by the display device 362 indicates that an additional item is available within the sixth region 316 that includes radio frequency antenna 354. As in the previous example, the additional item is complimentary to the item, an alternative to the item, superior to the item, and so forth. The detection module 202 receives the radio wave data 158 as describing the unique identifier of the radio frequency tag embedded in the physical receptacle 148 and the unique identifier of the radio frequency antenna 326 instead of a unique identifier of the radio frequency antenna 354. In this other example, the tracking module 154 determines that the new trajectory 402 is not based on the information related to the item displayed by the display device 362 because the physical receptacle 148 is not within the sixth region 316.

The physical receptacle 148 moves within the physical environment 106 along the new trajectory 402 and approaches the additional region 318 that includes the radio frequency antenna 356. For example, the additional region 318 does not contain any of the items that are available within the physical environment 106. In one example, the additional region 318 identifies items (if any) that have been removed from one of the regions 306-316 and included in the physical receptacle 148 in order to update an inventory of the items that are available within the physical environment 106.

In a first example, the radio frequency tag embedded in the physical receptacle 148 receives radio waves transmitted by the radio frequency antenna 356 within the additional region 318. Upon receiving the radio waves from the radio frequency antenna 356, the radio frequency tag communicates final radio waves (e.g., to be associated with a final timestamp) to the radio frequency antenna 356 that indicate the unique identifier of the radio frequency tag that is embedded in the physical receptacle 148. The tracking module 154 receives the radio wave data 158 as describing the unique identifier of the radio frequency tag embedded in the physical receptacle 148 and a unique identifier of the radio frequency antenna 356. In this first example, the tracking module 154 processes the radio wave data 158 to end the new tracking session for the physical receptacle 148 within the physical environment 106.

In a second example, the radio frequency tag embedded in the physical receptacle 148 receives radio waves transmitted by the radio frequency antenna 322 that is included in or adjacent to the exit 304. Upon receiving the radio waves from the radio frequency antenna 322, the radio frequency tag communicates final radio waves (e.g., to be associated with the final timestamp) to the radio frequency antenna 322 that indicate the unique identifier of the radio frequency tag that is embedded in the physical receptacle 148. The tracking module 154 receives the radio wave data 158 as describing the unique identifier of the radio frequency tag embedded in the physical receptacle 148 and a unique identifier of the radio frequency antenna 322. In this second example, the tracking module 154 processes the radio wave data 158 to end the new tracking session for the physical receptacle 148 within the physical environment 106.

It is to be appreciated that the described systems for tracking receptacles in physical environments are capable of tracking multiple physical receptacles simultaneously within the physical environment 106 such as physical receptacles 148, 150. It is also to be appreciated that the display devices 358-362 are each capable of generating multiple indications of information related to items available within the physical environment 106 for simultaneous display in a user interface of a single one of the display devices 358-362 or in user interfaces of multiple ones of the display devices 358-362. For example, the display device 362 is capable of generating an indication of information related to the additional item for simultaneous display in the user interface with the indication of the information related to the item. In another example, the tracking module 154 is capable of tracking groups of physical receptacles within the physical environment 106 and causing the display devices 358-362 to display indications of information for the groups of physical receptacles in a user interface of a single one of the display devices 358-362 or in user interfaces of multiple ones of the display devices 358-362.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which an item is identified based on an amount of time that a physical receptacle is within a region of a physical environment, and an indication of information related to the item is generated for display in the physical environment.

Radio wave data is received describing first radio waves received by a first radio frequency antenna from a radio frequency tag embedded in a physical receptacle within first region of a physical environment based on radio waves transmitted by the first radio frequency antenna within the first region, the first radio waves from the radio frequency tag indicating a unique identifier of the radio frequency tag (block 502). For example, the computing device 102 implements the tracking module 154 to receive the radio wave data. An amount of time is computed that the physical receptacle is within the first region based on the unique identifier of the radio frequency tag (block 504). In one example, the tracking module 154 computes the amount of time that the physical receptacle is within the first region.

An item is identified that does not include a radio frequency tag based on the amount of time and a unique identifier of the first radio frequency antenna (block 506). The computing device 102 implements the tracking module 154 to identify the item in some examples. An indication of information related to the item is generated for display in a user interface of a display device disposed in a second region of the physical environment based on second radio waves received by a second radio frequency antenna from the radio frequency tag (block 508). In an example, the tracking module 154 generates the indication of information related to the item for display in the user interface.

Example System and Device

Figure 6:
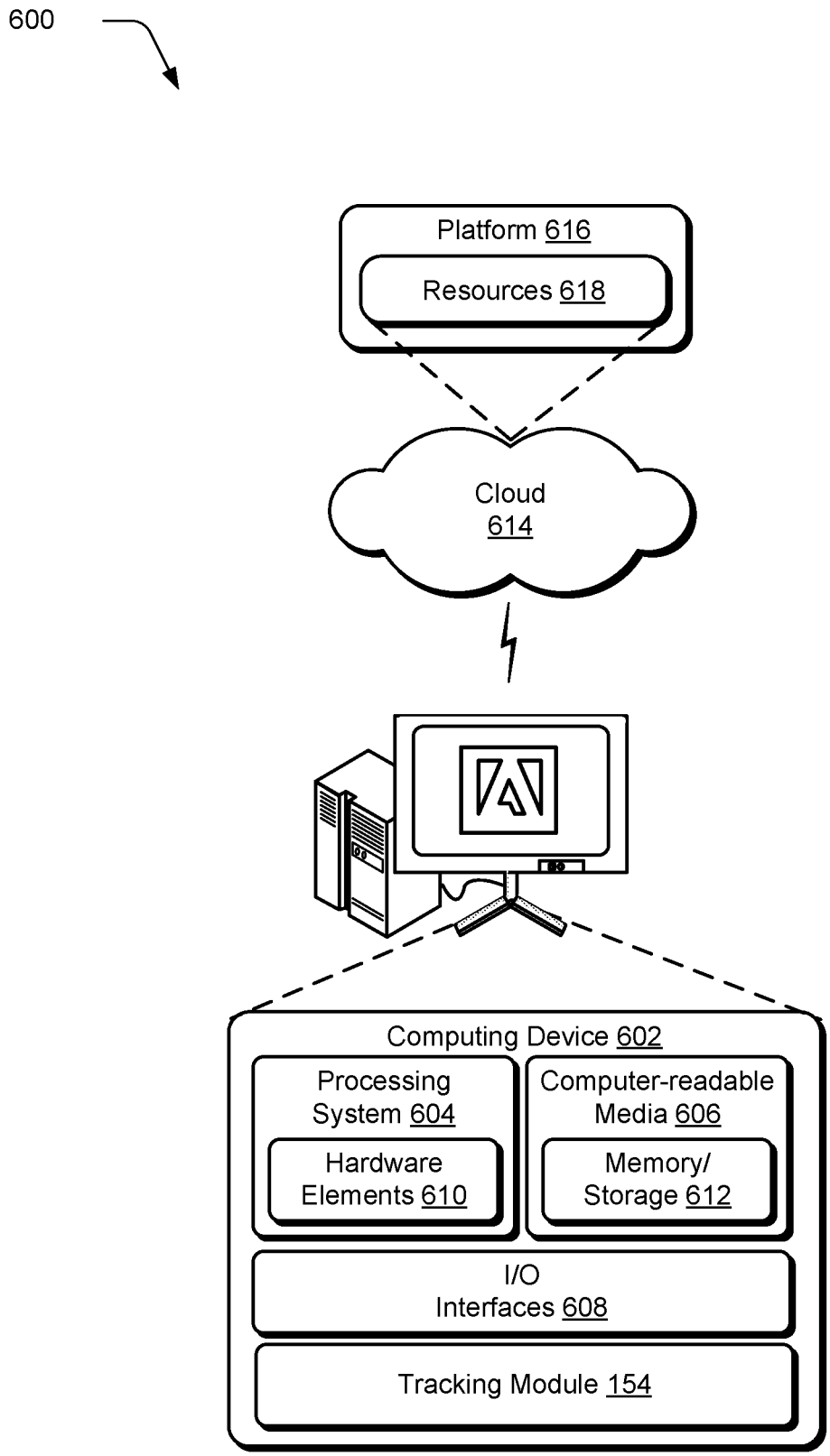
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the tracking module 154. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage 612 includes volatile media (such as random access memory (RAM)) and/or nonvolatile media (such as read only memory (ROM), Flash memory, optical disks, magnetic disks, and so forth). In another example, the memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for tracking receptacles in physical environments have been described in language specific to structural features and/or methods, it is to be understood that the appended claims are not necessarily limited to the specific features or methods described. Rather, the specific features and methods are disclosed as example implementations of systems for tracking receptacles in physical environments, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a computing device, radio wave data describing first radio waves received by a first radio frequency antenna from a radio frequency tag embedded in a physical receptacle within a first region of a physical environment based on radio waves transmitted by the first radio frequency antenna within the first region, the first radio waves from the radio frequency tag indicating a unique identifier of the radio frequency tag;
computing, by the computing device, an amount of time that the physical receptacle is within the first region based on the unique identifier of the radio frequency tag;
identifying, by the computing device, an item that does not include a radio frequency tag based on the amount of time and a unique identifier of the first radio frequency antenna; and
generating, by the computing device, an indication of information related to the item for display in a user interface of a display device disposed in a second region of the physical environment based on second radio waves received by a second radio frequency antenna from the radio frequency tag.

2. The method as described in claim 1, wherein third radio waves are received by a third radio frequency antenna from the radio frequency tag, the third radio frequency antenna is disposed in a third region of the physical environment.

3. The method as described in claim 2, wherein receiving the third radio waves from the radio frequency tag indicates a beginning or an end of a session for tracking the physical receptacle within the physical environment.

4. The method as described in claim 3, wherein the third region is adjacent to an entrance into the physical environment or an exit out from the physical environment.

5. The method as described in claim 2, wherein receiving the third radio waves from the radio frequency tag indicates an occurrence of an event based on the indication of information related to the item.

6. The method as described in claim 1 further comprising:
identifying an additional item that does not include a radio frequency tag based on the unique identifier of the radio frequency tag and a unique identifier of the second radio frequency antenna; and
generating an indication of information related to the additional item for simultaneous display in the user interface of the display device with the indication of information related to the item.

7. The method as described in claim 1 further comprising:
receiving additional radio wave data describing first radio waves received by a third radio frequency antenna from an additional radio frequency tag embedded in an additional physical receptacle within a third region of the physical environment based on radio waves transmitted by the third radio frequency antenna within the third region, the first radio waves from the additional radio frequency tag indicating a unique identifier of the additional radio frequency tag;
computing an additional amount of time that the additional physical receptacle is within the third region based on the unique identifier of the additional radio frequency tag;
identifying an additional item based on the additional amount of time and a unique identifier of the third radio frequency antenna; and
generating an indication of information related to the additional item for simultaneous display in the user interface of the display device with the indication of information related to the item.

8. The method as described in claim 7, wherein the indication of information related to the additional item is generated based on second radio waves from the additional radio frequency tag received by the second radio frequency antenna.

9. The method as described in claim 7, wherein the additional item does not include a radio frequency tag.

10. The method as described in claim 7, wherein the item and the additional item are included in a set of items that are available within the physical environment.

11. A system comprising:
a detection module implemented by one or more processing devices to:
receive radio wave data describing first radio waves received by a first radio frequency antenna from a radio frequency tag embedded in a physical receptacle within a first region of a physical environment based on radio waves transmitted by the first radio frequency antenna within the first region, the first radio waves from the radio frequency tag indicating a unique identifier of the radio frequency tag; and
compute an amount of time that the physical receptacle is within the first region based on the unique identifier of the radio frequency tag;
an item module implemented by the one or more processing devices to identify an item that does not include a radio frequency tag based on the amount of time and a unique identifier of the first radio frequency antenna; and
a display module implemented by the one or more processing devices to generate an indication of information related to the item for display in a user interface of a display device disposed in a second region of the physical environment based on second radio waves received by a second radio frequency antenna from the radio frequency tag.

12. The system as described in claim 11, wherein the item is an only item available within the first region.

13. The system as described in claim 11, wherein the item is included in a set of items that are available within the first region.

14. The system as described in claim 11, wherein third radio waves are received by a third radio frequency antenna from the radio frequency tag based on radio waves transmitted by the third radio frequency antenna within a third region of the physical environment and wherein the indication of information related to the item indicates a related item that is available within the third region.

15. A non-transitory computer-readable storage medium storing executable instructions, which when executed by a processing device, cause the processing device to perform operations comprising:
receiving radio wave data describing first radio waves received by a first radio frequency antenna from a radio frequency tag that is embedded in a physical receptacle and second radio waves received by a second radio frequency antenna from the radio frequency tag, the first radio frequency antenna is disposed within a first region of a physical environment and the second radio frequency antenna is disposed within a second region of the physical environment;
computing a first amount of time that the radio frequency tag is disposed within the first region and a second amount of time that the radio frequency tag is disposed within the second region based on a unique identifier of the radio frequency tag;
identifying an item based on the first amount of time and the second amount of time; and
generating an indication of information related to the item for display in a user interface of a display device that is disposed in a third region of the physical environment based on third radio waves received by a third radio frequency antenna from the radio frequency tag.

16. The non-transitory computer-readable storage medium as described in claim 15, wherein the item is available within the second region and the second amount of time indicates that the item is included in physical receptacle.

17. The non-transitory computer-readable storage medium as described in claim 15, wherein the physical receptacle is available within the first region and the first amount of time indicates a beginning of a session for tracking the physical receptacle within the physical environment.

18. The non-transitory computer-readable storage medium as described in claim 15, wherein the item does not include a radio frequency tag.

19. The non-transitory computer-readable storage medium as described in claim 15, wherein the first region is adjacent to an entrance into the physical environment.

20. The non-transitory computer-readable storage medium as described in claim 15, wherein the item is identified based on a unique identifier of the second radio frequency antenna.

* * * * *